Feb. 11, 1958 E. C. BAUER, JR 2,823,082
TREAD UNIT TRACTOR RAILS

Filed Sept. 28, 1956 2 Sheets-Sheet 1

INVENTOR

EUGENE C. BAUER, JR.

BY

ATTORNEY

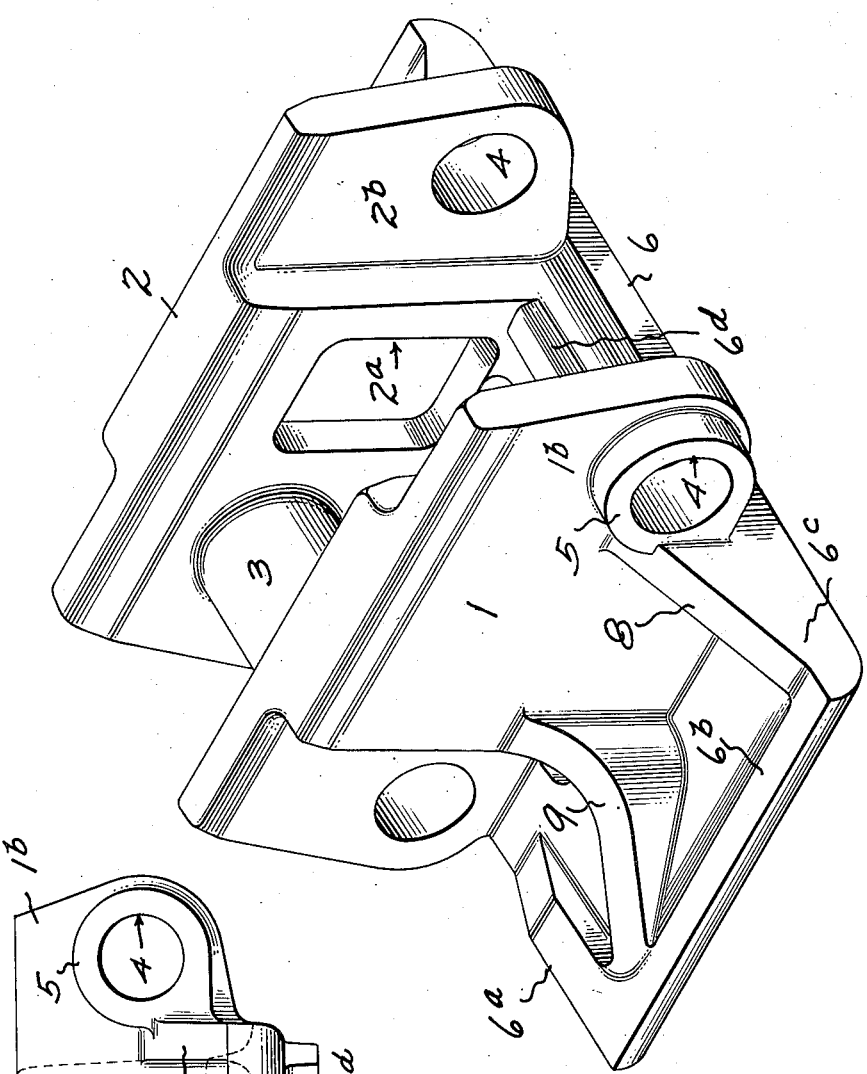
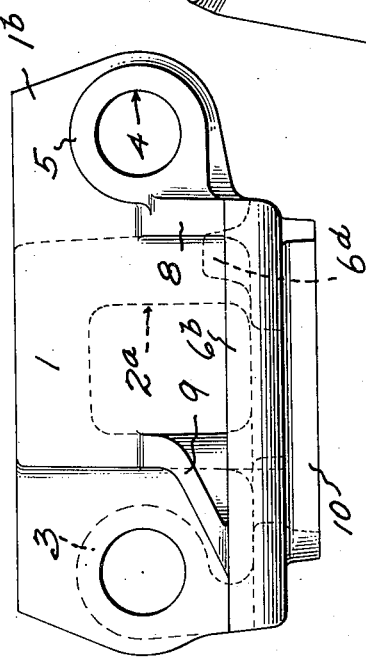
FIG. 4.
FIG. 3.
INVENTOR
EUGENE C. BAUER, JR.
BY
ATTORNEY

United States Patent Office 2,823,082
Patented Feb. 11, 1958

2,823,082
TREAD UNIT TRACTOR RAILS

Eugene C. Bauer, Jr., Park Ridge, Ill., assignor to Poor & Company, Chicago, Ill., a corporation of Delaware Application September 28, 1956, Serial No. 612,661

1 Claim. (Cl. 305—10)

This invention relates to an improvement in tread units, which when pivotally connected, make endless tracks or rails for earth working machines or the like.

Heretofore, it has been the practice to make the endless track of separate parts, namely link units pivotally connected and propelled by driving sprockets, and detachable grouser plates on the bottoms of the links for engaging the ground. This practice was usually followed because the grouser plate wore out before the link and was required to be replaced to maintain the track in service. This is objectionable from the standpoint of cost of parts, loss of time-out for repairs, and the high labor cost of maintenance.

One of the objects of the present invention is to make an integrated tread unit which eliminates, among others, the objectionable factors mentioned, and has numerous advantages over the units now in use. That is to say, the article of the invention herein has longer life; is of such a strong and sturdy character that endless track vehicles are seldom laid up for repairs; and maintenance costs are materially reduced, all of which are important from the standpoint of the user. While the combined link and grouser plate can be made by casting any desired metal, nevertheless, it is proposed to make the units of the present invention of austenitic manganese steel.

Another object of the invention is to provide the area of connection between the grouser plate portion and the link portion with structural features which increase strength to resist bending up at the ends and corners of the tread as often happens with plates now in use.

A further object of the invention is to eliminate bolts and the assembly time of fitting separate plates to the rail and tightening the nuts on the bolts. Moreover, by eliminating the bolts it is not necessary to provide holes through the web of the plate at a location where the web is weakened thereby providing a web or tread which more effectively supports the load of the tractor and has longer life.

A still further object resulting from the elimination of bolt holes enables the tread face of the grouser plate to be provided with a V-shaped ground engaging or traction bar, as distinguished from a bar straight across the front edge of the plate as now used in the bolt-on type. Where the grouser plate is now bolted to the link, the traction element must be made straight across laterally so that it will not interfere with the bolt holes in the tread face. This arrangement has the disadvantage that it causes the supporting rollers to bounce up and down over the rails or tracks and not only give a rough ride but at the same time shake the machine so that the wear factor from vibration is substantially increased. On the other hand, with a V-shaped grouser bar on a boltless type tread as proposed herein, the tread is supported evenly from the front edge to the back edge and holds the rail surface in an even line allowing rollers to follow a comparatively even path.

With the above and other objects in view which will more readily appear as the nature of the invention is better understood, the same consists in the novel construction, combination, and arrangement of parts, hereinafter more fully described, illustrated, and claimed.

A preferred and practical embodiment of the invention is shown in the accompanying drawings, in which:

Fig. 3 is a side elevation of the unit shown in Fig. 1.

Fig. 4 is a perspective view of the invention.

Similar reference characters designate corresponding parts throughout the several figures of the drawings, wherein the integrated unit includes a rail portion designated generally as A, and a grouser plate portion B cast in one piece.

Figure 1:
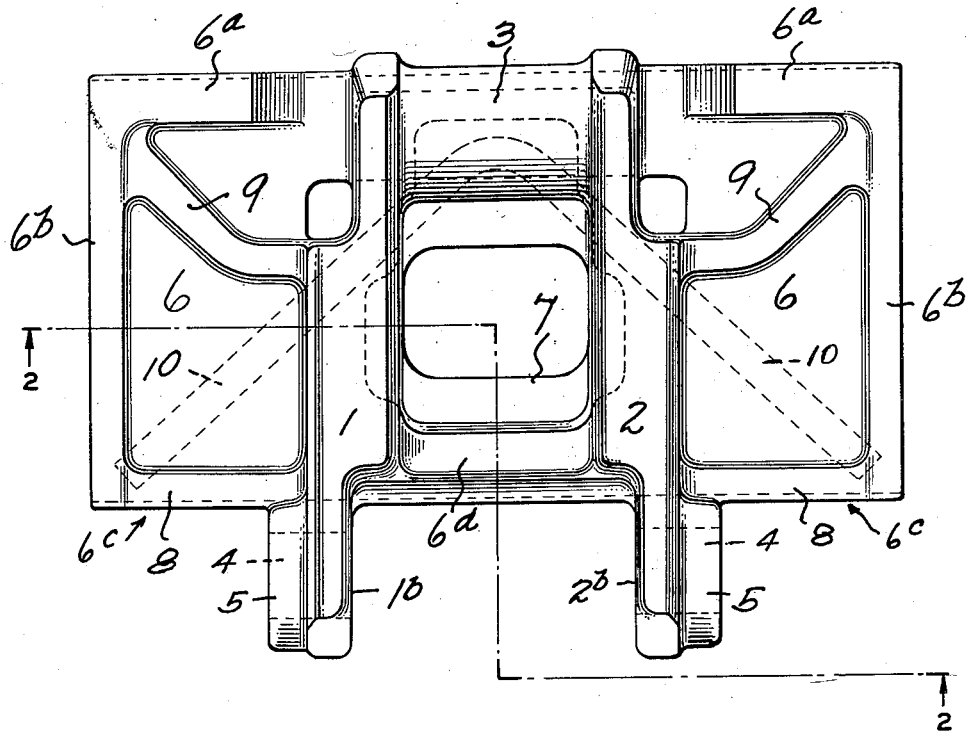
Fig. 1 is a top plan view of the combined link and grouser plate.

Referring first to the link portion A, it will be observed that it includes the opposite side walls 1 and 2 arranged in spaced relation and joined at one end by a tubular barrel 3 for receiving one of the pivot pins which connect the units to form an endless track or trail. The opposite rear ends of the wall elements 1 and 2 are provided with eyes 4 which have outwardly facing collars 5 for receiving the other pivot pin. The wall 2 is provided with an opening $2^a$ to assist crushed rock or the like escaping from the space between the walls so that when the teeth of the sprocket engage the barrel 3 the space between the walls will not be clogged or jammed with earthy material.

The bottom or outer side of the unit A has formed therewith the ground engaging plate 6 which extends laterally from side to side of the unit, as will be apparent from Fig. 1, and also extends longitudinally from the leading or front edge toward the back edge terminating at a point substantially beneath the junctions of the wall extensions $1^b$ and $2^b$ and in which extensions the eyes and collars 4—5 are formed. The space on the bottom plate between the walls 1 and 2 is provided with medial opening 7 which, in cooperation with the opening $2^a$ provides an additional outlet to provide debris clearance. The front, side and rear edges $6^a$, $6^b$ and $6^c$, respectively, of the plate are turned upwardly as indicated in all of the figures.

The rear corners and trailing edges $6^c$ of the plate 6 are formed with an upstanding reinforcing strut 8 extending between and progressively increasing in depth from the outer side edges $6^b$ to the related side walls 1 and 2.

The front corner portions of the plate 6 between edges $6^a$ and $6^b$ are provided with reinforcing struts 9 having the arcuate formation shown in Fig. 1. The reinforcing struts 9 at each leading corner of the unit are diagonally disposed and progressively increase in height and thickness from the junction of the edges $6^a$ and $6^b$ to the point where they become a part of the adjacent side wall element. This strut gives necessary strength to resist bending of the corner forming the junction between the upturned edges $6^a$ and $6^b$ and, at the same time, provides clearance for telescopically receiving the extended walls and pin of the next link to be connected.

Figure 2:
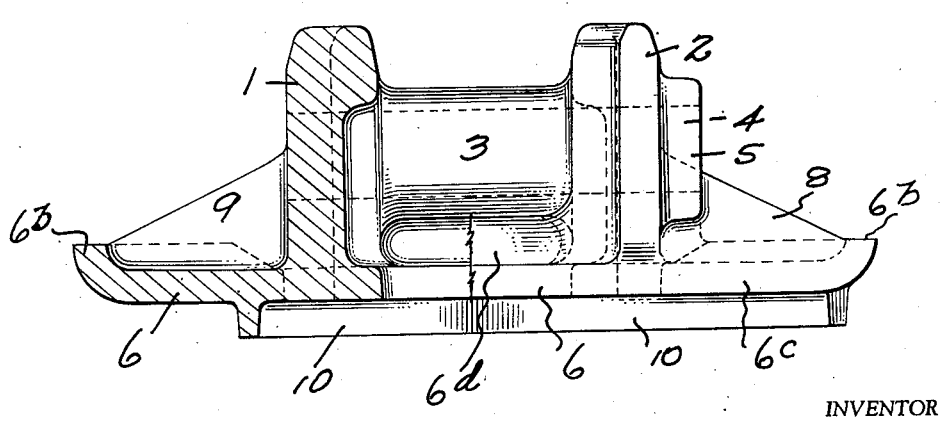
Fig. 2 is a view taken on the line 2—2 of Fig. 1.
Figure 2:

The front and rear struts, as will be seen from Figs. 2 and 4, are of substantially triangular formation and effectively prevent the corners of the plate bending upwardly under uneven load or pressure as the track travels over the surface of the ground.

The upper face of the plate 6 between the extensions $1^b$ and $2^b$ is provided with an upstanding transversely disposed reinforcing rib $6^d$ which in effect forms a continuation of the struts 8—8 and firmly unites the rear portions of the walls 1 and 2 as does the pin barrel 3 at the front. Also, it relieves stress on the pivot pin which fits in the eyes 4.

The bottom face of the plate 6 is provided with a V-shaped traction bar 10, the apex of the V being disposed toward the leading or front edge of the plate, while the rear ends extend to the reinforced rear corners of the plate. This bar provides an even ground engagement and avoids vibration in the track, sprockets, and rollers.

From the foregoing it will be seen that the present invention includes an integrated rail and grouser plate construction which conforms to the objects set forth herein and provides a practical and efficient solution to maintenance problems in connection with track of the type used on tractors.

I claim:

An integral tread and link unit for endless track rails, comprising, a bottom grouser plate portion forming a ground engaging tread, spaced upstanding walls located inwardly of and parallel to the outer side edges of the tread, said walls each having front pin receiving eyes disposed within one edge of the tread and connected by a pin barrel and a rear pair of pin receiving eyes disposed in the rearwardly projecting portions of said walls to be disposed outwardly of the rear edge of the grouser plate portion, a pair of transversely disposed alined struts connecting the outer rear corners of the grouser plate portion with the outer faces of said walls inwardly of said rear pair of eyes, a reinforcing rib substantially in line with said struts and disposed between said walls to provide strength to the rear portions of said walls comparable to that furnished by the pin barrel to the front portions of said walls and also to relieve stress on a pin passing through said rear eyes, and a pair of curved struts extending obliquely inwardly from the front corners of the grouser plate portion toward the front portions of said walls in clearing relation to the pin barrel, all of said struts being of progressively increasing vertical thickness from a corner toward a related wall, and a V-shaped ground engaging bar on the underside of the grouser plate portion with the apex of said V disposed at the front of the plate to provide a ground engaging tread face which avoids transmission of shock to the track.

References Cited in the file of this patent

UNITED STATES PATENTS

| | | |
|---|---|---|
| 1,872,819 | Rorabeck | Aug. 23, 1932 |
| 2,743,140 | Bauer | Apr. 24, 1956 |